United States Patent
Cauvin et al.

(10) Patent No.: US 8,492,477 B2
(45) Date of Patent: Jul. 23, 2013

(54) SILICONE POLYMER DISPERSION AND METHOD OF FORMING SAME

(75) Inventors: Severine Cauvin, Braine-Le Comte (BE); Glenn V. Gordon, Midland, MI (US); Donald T. Liles, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 144 days.

(21) Appl. No.: 12/922,003

(22) PCT Filed: Mar. 11, 2009

(86) PCT No.: PCT/US2009/001543
§ 371 (c)(1),
(2), (4) Date: Sep. 10, 2010

(87) PCT Pub. No.: WO2009/114140
PCT Pub. Date: Sep. 17, 2009

(65) Prior Publication Data
US 2011/0028635 A1    Feb. 3, 2011

Related U.S. Application Data

(60) Provisional application No. 61/035,906, filed on Mar. 12, 2008.

(51) Int. Cl.
*C08G 77/06* (2006.01)
*C08G 77/50* (2006.01)

(52) U.S. Cl.
USPC ............ 524/837; 528/15; 528/25; 528/31; 528/32

(58) Field of Classification Search
None
See application file for complete search history.

(56) References Cited

U.S. PATENT DOCUMENTS

| 4,248,751 | A | 2/1981 | Willing |
| 4,640,967 | A | 2/1987 | Eckberg |
| 5,908,951 | A * | 6/1999 | Kobayashi et al. ........... 556/479 |
| 6,013,682 | A | 1/2000 | Dalle et al. |
| 6,252,100 | B1 | 6/2001 | Herzig |
| 6,476,123 | B1 * | 11/2002 | Morita et al. ................. 524/837 |
| 6,878,773 | B2 | 4/2005 | Marteaux et al. |
| 7,887,834 | B2 * | 2/2011 | Lin et al. ....................... 424/450 |
| 2002/0061365 | A1 | 5/2002 | Grape et al. |
| 2006/0104929 | A1 * | 5/2006 | Morita et al. .............. 424/70.12 |

FOREIGN PATENT DOCUMENTS

| EP | 0539065 A1 | 4/1993 |
| EP | 0922734 A1 | 6/1999 |
| JP | 10060283 A | 3/1998 |
| JP | 11292970 A | 10/1999 |

OTHER PUBLICATIONS

PCT International Search Report for PCT/US2009/001543, dated Jun. 17, 2009, 3 pages.
English language abstract for JP 10060283 extracted from the espacenet.com database on Jan. 10, 2013, 11 pages.
English language abstract for JP 11292970 extracted from the espacenet.com database on Jan. 10, 2013, 66 pages.

* cited by examiner

*Primary Examiner* — Marc Zimmer
(74) *Attorney, Agent, or Firm* — Howard & Howard Attorneys PLLC

(57) ABSTRACT

A dispersion includes dispersed particles. The particles include a reaction product of a first polymer, a second polymer, and a chain terminator. The first and second polymers have at least two Si—H moieties and silicon bonded unsaturated moieties, respectively. The chain terminator has one Si—H moiety or one unsaturated hydrocarbon moiety. The first and second polymers and the chain terminator are reacted in the presence of a metal catalyst. The dispersion is formed by a method that includes the step of combining the first and second polymers, and the chain terminator. This method also reacts the first and second polymers and the chain terminator in the presence of the metal catalyst to form the dispersed particles.

36 Claims, No Drawings

SILICONE POLYMER DISPERSION AND METHOD OF FORMING SAME

RELATED APPLICATIONS

This application claims priority to and all the advantages of International Patent Application No. PCT/US2009/001543, filed on Mar. 11, 2009, which claims priority to United States Provisional Patent Application No. 61/035,906 filed on Mar. 12, 2008.

FIELD OF THE INVENTION

The present invention generally relates to a silicone polymer dispersion and a method of forming the dispersion. More specifically, the dispersion includes dispersed particles including the reaction product of two different polymers and a chain terminator.

DESCRIPTION OF THE RELATED ART

Dispersions and particles dispersed within dispersions, i.e., dispersed particles, are known to be useful in plastics, coatings, and cosmetics and can be formed using different production processes known in the art. One type of process, emulsion polymerization, forms particles in an emulsion but has a number of drawbacks. For instance, polymerization in this type of process occurs at an "oil-water" interface. As such, formation of small particles with large surface areas is kinetically favored, thus rendering production of larger particles difficult and energy consuming. Similarly, emulsion polymerization requires a number of expensive processing steps and materials. In one example, emulsion polymerization requires long batch times and caustic materials which must be neutralized. These types of requirements increase production costs which are typically passed along to the end user. In another example, emulsion polymerization requires use of anionic and cationic surfactants which may irritate skin when used in cosmetic applications.

A second type of process for producing dispersions and dispersed particles is mechanical emulsion. In this process, a non-polar compound such as a hydrophobic oil or polymer is typically emulsified with a variety of surfactants and water using mechanical mixers. Although not requiring long processing times, this type of process is limited by shear stress which can be induced by the mechanical mixers and a viscosity of the hydrophobic oil or polymer.

To remedy the drawbacks of both of these methods, other types of dispersion polymerization processes have been developed. Although effective, these processes do not allow for maximized control over formation of the dispersed particles. More specifically, these processes do not allow for customization of molecular weight or viscosity of the dispersed particles and, therefore, are limited in their usefulness.

Accordingly, there remains an opportunity to form a dispersion including particles dispersed therein using processes that maximize the ability to customize molecular weight and viscosity of the dispersed particles. There also remains an opportunity to develop processes that are cost effective and efficient. There further remains an opportunity to use these particles in cosmetic applications to reduce skin irritation and improve skin feel.

SUMMARY OF THE INVENTION AND ADVANTAGES

The instant invention provides a dispersion and a method of forming the dispersion. The dispersion includes dispersed particles. The dispersed particles include the reaction product of a first polymer, a second polymer, and a chain terminator. The first polymer has at least two Si—H moieties. The second polymer has at least two silicon bonded unsaturated moieties. The chain terminator has one Si—H moiety or unsaturated hydrocarbon moiety. The first and second polymers and the chain terminator are reacted in the presence of a metal catalyst. The method of forming the dispersion includes the step of combining the first and second polymers and the chain terminator. The method also includes the step of reacting the first and second polymers and the chain terminator in the presence of the metal catalyst to form the dispersed particles.

The dispersion and method of forming the dispersion can be effectively utilized in a variety of industries including cosmetic and coating applications. The dispersed particles produce an improved skin feel in cosmetic applications. When incorporated into paints or coatings, the dispersed particles provide lubricity to surfaces of the paints or coatings and also provide resistance to marring. The dispersion also allows the dispersed particles to be handled easily and allows for quality checks on the dispersed particles to be performed efficiently and accurately. Further, the method maximizes an ability to customize molecular weight and viscosity of the dispersed particles through reaction of the chain terminator with the first and second polymers. Still further, the method is cost effective.

DETAILED DESCRIPTION OF THE INVENTION

The instant invention provides a dispersion and a method of forming the dispersion. As is known in the art, dispersions include one phase of matter that is immiscible with, and dispersed in, another phase of matter, i.e., a dispersed phase in a continuous phase. In the instant invention, the dispersion includes dispersed particles (hereinafter referred to as "particles"). The particles may be solids, liquids, gasses, or combinations thereof. Typically, the particles are liquids or solids.

In one embodiment, the dispersion includes a liquid and the particles are dispersed in the liquid. Of course it is to be understood that the particles may themselves be liquid particles, or may include liquids as diluents, such that no external or additional liquids are required. Alternatively, the liquid may be an external liquid that is added independently of any other component. In one embodiment, the liquid is a non-polar liquid. In another embodiment, the liquid is a polar liquid such as an alcohol or water. Typically, the liquid is water. The water may be tap water, well water, purified water, deionized water, and combinations thereof and may be present in the dispersion in varying amounts depending on the type of dispersion. In one embodiment, the dispersion includes solid particles as the dispersed phase and the liquid as the continuous phase. In another embodiment, the dispersion includes a non-polar liquid (e.g., non-polar liquid particles) as the dispersed phase and a polar liquid as the continuous phase. In various embodiments, the liquid may be present in amounts of from 20 to 80, of from 30 to 70, of from 40 to 60, or in an amount of about 50, parts by weight per 100 parts by weight of the dispersion, so long as a total amount of the dispersion does not exceed 100 parts by weight.

The dispersion may be further defined as a "colloid" or "colloid dispersion," terminology which can be used interchangeably. Typically, colloids include particles of less than 100 nanometers in size dispersed in the continuous phase. Colloids may be classified in numerous ways. For purposes of the instant invention, the colloid may also be classified as a gel (liquid particles as the dispersed phase and a solid continuous phase), an emulsion (liquid particles as the dispersed phase and a liquid continuous phase), and/or a foam (gas particles as the dispersed phase and a liquid continuous phase). The colloid may be reversible (i.e., exist in more than one state) or irreversible. Further, the colloid may be elastomeric or viscoelastic.

The dispersion may be further defined as an emulsion, as first introduced immediately above. As is understood in the art, emulsions are one type of dispersion and are typically classified into one of four categories according to a chemical nature of the dispersed and continuous phases. A first category is an oil-in-water (O/W) emulsion. O/W emulsions typically include a non-polar dispersed phase (e.g., oil) in an aqueous continuous phase (e.g. water) which forms particles. For purposes of the instant invention, the terminology "oil" includes non-polar molecules, may include any non-polar compound, and may include the particles of the invention. A second category of emulsion is a water-in-oil (W/O) emulsion. W/O emulsions typically include a polar dispersed phase such as water or other hydrophilic substances or mixtures thereof in a non-polar continuous phase such as a hydrophobic oil or polymer. A third category is a water-in-oil-in-water (W/O/W) emulsion. These types of emulsions include a polar dispersed phase in a non-polar continuous phase which is, in turn, dispersed in a polar continuous phase. For example, W/O/W emulsions may include water droplets entrapped within larger oil droplets that in turn are dispersed in a continuous water phase. A fourth category is a water-in-water (W/W) emulsion. These types of emulsions include aqueous solvated molecules, e.g., particles of the invention, in a continuous aqueous solution wherein both the aqueous solvated molecules and the continuous aqueous solution include different molecules that are water-soluble. Without intending to be bound by any particular theory, it is believed that the aforementioned types of emulsions depend on hydrogen bonding, pi stacking, and/or salt bridging of both the dispersed and continuous phases. In this invention, the dispersion may be further defined as any one of these four types of emulsions.

As is also known in the art, dispersions are, to a certain degree, unstable. Typically, there are three types of dispersion instability including (i) flocculation, where particles of the dispersed phase form clumps in the continuous phase, (ii) creaming or sedimentation, where the particles of the dispersed phase concentrate respectively towards a top or bottom of the continuous phase, and (iii) breaking and coalescence, where the particles of the dispersed phase coalesce and form a layer of liquid in the continuous phase. The instant dispersion may exhibit one or more of these types of instability.

As is also known in the art, dispersions typically have two different types of viscosities, a total viscosity and a viscosity of the dispersed phase. The dispersion of the instant invention typically has a total viscosity of at least 20 centistokes at a temperature of 25° C. In various embodiments, the dispersion has a viscosity of at least 20 centistokes, more typically from about 30 to about 100 centistokes, most typically from about 40 to about 75 centistokes at a temperature of 25° C. using a Brookfield rotating disc viscometer equipped with a thermal cell and an SC4-31 spindle operated at a constant temperature of 25° C. and a rotational speed of 5 rpm. The viscosity of the dispersed phase is not limited and is not believed to affect the total viscosity. In one embodiment, the dispersed phase is solid and has an infinite viscosity.

Referring specifically to the particles introduced above, the particles may be of varying sizes. In one embodiment, the dispersion includes particles of from 1 nm to 100 µm, more typically of less than 1 µm, even more typically from 1 nm to 1 µm, and most typically of from 100 nm to 1000 nm. In another embodiment, the dispersion may be classified as a nanoemulsion. The dispersion may include particles smaller or larger than the sizes described immediately above, depending on the desire of those of skill in the art. The particles typically have a dynamic viscosity ($\eta$) of from $10^5$ to $10^9$ and more typically of from $10^6$ to $10^8$, cP×$10^6$ measured using a rheometer with an oscillation procedure (frequency sweep) of from $10^2$ to $10^{-3}$ Hz. However, the particles can have a dynamic viscosity outside of this range if desired.

The particles include a reaction product of a first polymer, a second polymer, and a chain terminator. It is contemplated that the particles may consist essentially of, or consist of, the reaction product of the first polymer, the second polymer and the chain terminator. In one embodiment, the reaction product is elastomeric. In another embodiment, the reaction product is non-elastomeric. The reaction product may be a thermoplastic or thermoset polymer. Alternatively, the reaction product may be linear or branched. Typically, the reaction product is linear.

The first polymer may include dimers, oligomers, polymers, pre-polymers, co-polymers, block polymers, star polymers, graft polymers, random co-polymers, and combinations thereof. The first polymer has at least two Si—H (silicon hydride) moieties which may be terminal or non-terminal. In one embodiment, the two Si—H moieties are non-terminal moieties. In another embodiment, one Si—H moiety is terminal and the other is not terminal. In a further embodiment, the two Si—H moieties are terminal moieties and the reaction product is not elastomeric. In yet another embodiment, the first polymer has two Si—H moieties and the reaction product is linear. In an additional embodiment, the first polymer is substantially linear and includes less than about 2 mole percent of branching units. In still a further embodiment, the first polymer has two terminal Si—H moieties. For descriptive purposes only, an exemplary chemical structure of one possible type of first polymer is shown below:

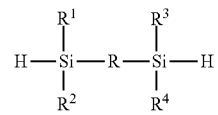

wherein R may be any organic or inorganic group and each of $R^1$ through $R^4$ may be the same or different. In one embodiment, none of $R^1$ through $R^4$ is reactive with an unsaturated group.

Typically, each of $R^1$ through $R^4$ is independently selected from the group of hydrocarbons having up to 20 carbon atoms such as an alkyl and aryl hydrocarbons, aliphatically unsaturated groups such as vinyl, allyl and hexenyl groups, hydroxyl groups, alkoxy groups such as methoxy, ethoxy and propoxy groups, alkoxy-alkoxy groups, acetoxy groups, amino groups, and combinations thereof. In an alternative embodiment, one or more of $R^1$ through $R^4$ are substituted with nitrogen groups, epoxy groups, sulfur groups, silicon groups, oxygen groups, or combinations thereof. In another embodiment, at least 80% of the $R^1$ through $R^4$ groups are alkyl groups such as methyl groups.

In yet another embodiment, the first polymer is selected from the group of silanes, siloxanes, silazanes, silicones, silicas, silenes, silsesquioxanes, and combinations thereof. In a further embodiment, the first polymer includes a siloxane. The siloxane may be further defined as a polydimethylsiloxane. The polydimethylsiloxane may be any known in the art so long as it includes at least two Si—H moieties. One particularly suitable polydimethylsiloxane is a dimethylvinylsiloxy terminated polydimethylsiloxane having a viscosity of about 55,000 mm²/sec at 25° C. Alternatively, the first polymer may be an organic polymer having the Si—H groups as terminal capping groups. Suitable non-limiting examples of organic polymers include polyethylenes, polypropylenes, polystyrenes, polyacrylates, polyethers, polyesters, polycarbonates, polyurethanes, polyamides, and combinations thereof. Typically, the first polymer has a viscosity of from 5 to 5,000, more typically of from 5 to 100, and most typically of about 10, cps at 25° C. as determined using a Brookfield rotating disc viscometer equipped with a thermal cell and an SC4-31 spindle operated at a constant temperature of 25° C. and a rotational speed of 5 rpm.

Like the first polymer, the second polymer may include dimers, oligomers, polymers, pre-polymers, co-polymers, block polymers, star polymers, graft polymers, random co-polymers, dendrimers, and combinations thereof. The second polymer has at least two silicon bonded unsaturated moieties and may be a chain extender. The terminology "silicon bonded unsaturated moieties" is understood to include unsaturated moieties directly bonded to at least one silicon atom. Typically, the silicon bonded unsaturated moieties are vinyl moieties. However, allyl moieties may also be used. As is known in the art, "unsaturated moieties" are chemical groups that have a carbon-carbon double or triple bond, i.e., groups that are not saturated with hydrogen atoms. In one embodiment, the two silicon bonded unsaturated moieties are terminal moieties. Alternatively, the two silicon bonded unsaturated moieties may be non-terminal. In another embodiment, one unsaturated moiety is terminal and the other is not terminal. In yet another embodiment, the second polymer has two silicon bonded unsaturated moieties. In a further embodiment, the second polymer has two terminal silicon bonded unsaturated moieties and the reaction product is not elastomeric. In an additional embodiment, the second polymer is substantially linear and includes less than about 2 mole percent of branching units. It is contemplated that the first and second polymers may both be substantially linear and include less than about 2 mole percent of branching units. For descriptive purposes only, an exemplary chemical structure of one possible type of second polymer is shown below:

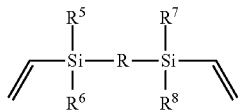

wherein R may be any organic or inorganic group and each of $R^5$ through $R^8$ may be the same or different. In one embodiment, none of $R^5$ through $R^8$ are hydrogen or are reactive with a Si—H moiety.

The second polymer may be selected from the group of silanes, siloxanes, silazanes, silicones, silicas, silenes, silsesquioxanes, and combinations thereof. In one embodiment, the second polymer includes a siloxane. The siloxane may be further defined as a polydimethylsiloxane. The polydimethylsiloxane may be any known in the art so long as it includes at least two silicon bonded unsaturated moieties. One particularly suitable polydimethylsiloxane is a hydrogen-dimethylsiloxy terminated polydimethylsiloxane having a viscosity of about 10 mm²/sec at 25° C. Alternatively, the second polymer may be an organic polymer having the silicon bonded unsaturated moieties as terminal capping groups. Suitable non-limiting examples of organic polymers include polyethers, polyesters, polycarbonates, polyurethanes, polyamides, and combinations thereof. In one embodiment, the silicon bonded unsaturated moieties are, for example, vinyl or allyl groups. In another embodiment, the second polymer is a polymer having a backbone of carbon-carbon bonds such as an addition polymer. The second polymer may be a polymer that has repeating units with electron donor characteristics such as diallyl-endblocked polyisobutylenes, which are available commercially with various chain lengths. Particularly suitable polyisobutylenes have number average molecular weights of from 1,000 to 50,000 and more typically from 2,000 to 20,000. The second polymer can alternatively include hetero atom linkages such as ether, ester, amide, imide or urethane linkages. Examples include polyoxyalkylene glycols etherified with an unsaturated group, such as polyethylene glycol divinyl ether, or an acrylate or methacrylate polymer such as a urethane acrylate.

Alternatively, the second polymer may include a non-conjugated diene such as an alpha, omega-diene having 6 to 30 carbon atoms such as 1,5-hexadiene or 1,7-octadiene. The diene can have more than 30 carbon atoms but is typically liquid. In one embodiment, the second polymer includes two vinyl or allyl groups and may be a diallyl ether, a diallyl amine, a diallyl carbonate, a diallyl phthalate, a diallyl succinate, a 1,3-diallyl urea, an allyl methacrylate, a propylene glycol divinyl ether or a tetraethylene glycol divinyl ether. Typically, the second polymer has a viscosity of from 100 to 600,000, more typically of from 10,000 to 100,000, and most typically of about 50,000, cps at 25° C. as determined using a Brookfield rotating disc viscometer equipped with a thermal cell and an SC4-31 spindle operated at a constant temperature of 25° C. and a rotational speed of 5 rpm. In some embodiments, the polymers may not be soluble in one another and a solvent or other compatibilizing substance may be used to effect a more compatible composition.

As set forth above, the particles include a reaction product of the first polymer, the second polymer, and the chain terminator. The chain terminator has one Si—H moiety or unsaturated hydrocarbon moiety per molecule, i.e., exactly one Si—H or unsaturated hydrocarbon moiety per molecule. In one embodiment, the chain terminator consists of a single Si—H moiety or unsaturated hydrocarbon moiety. It is to be understood that the terminology "consists of a single Si—H moiety or unsaturated hydrocarbon moiety" refers only to the chain terminator. Said differently, the chain terminator can have other functional or non-functional groups so long as it has a single Si—H moiety or unsaturated hydrocarbon moiety. However, the chain terminator cannot have both a Si—H moiety and an unsaturated hydrocarbon moiety. Without intending to be bound by any particular theory, it is believed that the chain terminator reacts with either the first or second polymer to reduce chain length and stop reaction of the first polymer and the second polymer. In one embodiment, reaction of the first and second polymers and the chain terminator takes place at an interior of droplets of the first and second polymers in the dispersion (i.e., not at a "oil/water" interface). Without intending to be bound by any particular theory, it is believed that a degree of polymerization is not controlled by droplet size, but by a ratio of the first and second polymers and an amount of the chain terminator used. The single Si—H moiety allows the chain terminator to react with the unsaturated moiety of the second polymer but does not allow for additional reaction thereby preventing chain growth and "terminating" the chain. Alternatively, a single unsaturated hydrocarbon moiety of the chain terminator may react with an Si—H moiety of the first polymer, but does not allow for additional reaction thereby preventing chain growth and "terminating" the chain. For descriptive purposes only, exemplary chemical structures of two possible types of chain terminator are shown below:

and

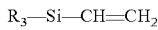

wherein R may be any organic or inorganic group. Also for descriptive purposes only, an exemplary chemical reaction scheme of the reaction of typical first and second polymers and a typical chain terminator is shown below:

silicones, silicas, silenes, silsesquioxanes, and combinations thereof. In another embodiment, the chain terminator is a siloxane and has the chemical formula: $(CH_3)_3SiOSiH(CH_3)OSi(CH_3)_3$. Alternatively, the chain terminator may be a silane and have the chemical formula: $(CH_3)_2Si(C_6H_5)H$. Further, the chain terminator may include a siloxane and a silane. Other possible chain terminators include $(CH_3)_3SiH$, $(C_2H_5)_3SiH$, $((CH_3)_3SiO)_3SiH$, and combinations thereof.

Alternatively, the chain terminator may be an organic polymer. Suitable non-limiting examples of such organic polymers include alpha olefins, polyethers, polyesters, polycarbonates, polyurethanes, polyamides, and combinations thereof, so long as the chain terminator has the one Si—H

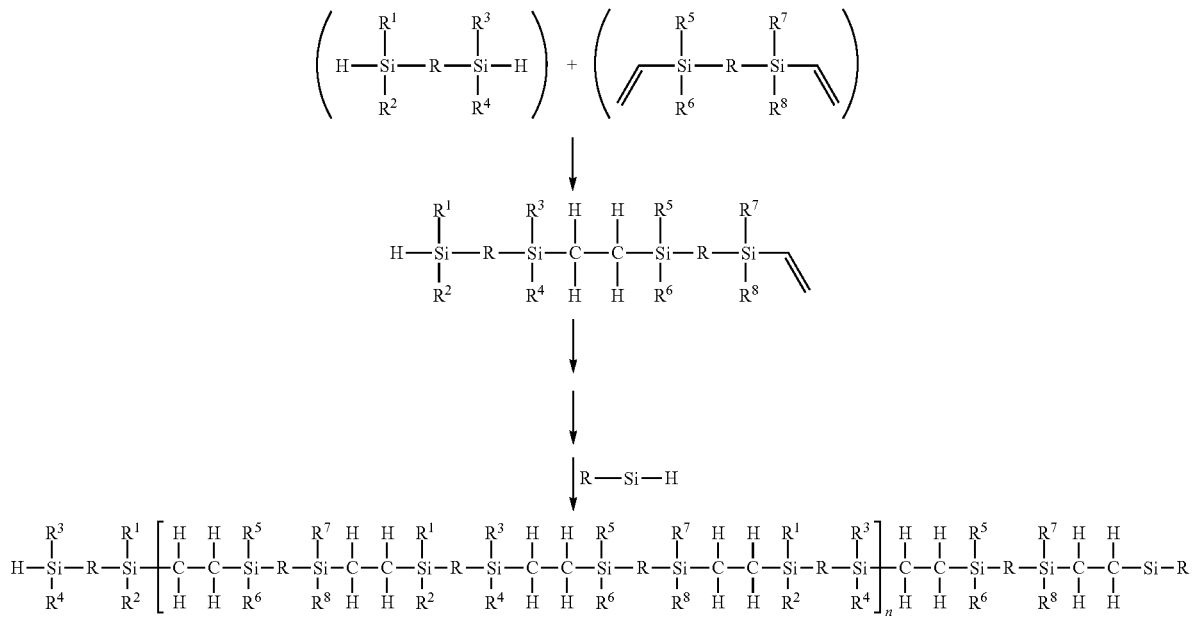

wherein n may be any positive number. Of course, it is to be understood that in the above reaction scheme, the three reaction arrows indicate multiple reactions of the first polymer and the second polymer in a chain elongation reaction followed by a reaction of the chain terminator.

As shown directly above, the chain terminator stops chain elongation at one end of the polymer due to its single Si—H moiety or unsaturated hydrocarbon moiety. The chain terminator is also capable of stopping chain growth (chain elongation) at both ends of the polymer making up the particle. This is related to a concentration of the chain terminator in that at high concentrations, the probability of two ends of a chain being terminated is greater. This stopping of chain elongation at one or both ends controls polymer size, number and weight average molecular weights, and viscosity. Thus, the chain terminator allows for manipulation and control of polymer size and viscosity and allows for customization based on end user preferences. The chain terminator also allows for formation of a broad range of monodisperse droplet sizes including polysiloxanes with controlled viscosities.

The chain terminator is not limited in structure other than it must have one Si—H moiety or one unsaturated hydrocarbon moiety. The Si—H moiety or unsaturated hydrocarbon moiety may be a terminal group or an internal group. In one embodiment, the chain terminator has one Si—H moiety and is selected from the group of silanes, siloxanes, silazanes, moiety or one unsaturated hydrocarbon moiety. Such silicon bonded unsaturated moieties typically can be reacted with a Si—H moiety. Examples of such compounds include, but are not limited to, $(CH_3)_3SiCH=CH_2$, $(CH_3)_3SiCH_2CH=CH_2$, $(C_2H_5)_3SiCH=CH_2$, $((CH_3)_3SiO)_3SiCH=CH_2$, $C_6H_{13}CH=CH_2$, styrene, α-methyl styrene, 1-hexene, 1-octene, 1-decene, and combinations thereof. In one embodiment, the chain terminator has one unsaturated hydrocarbon moiety and is further defined as an alpha olefin. Typically, the chain terminator has a viscosity of from 0.5 to 5,000, more typically of from 0.5 to 10, and most typically of about 0.8, cps at 25° C. as determined using a Brookfield rotating disc viscometer equipped with a thermal cell and an SC4-31 spindle operated at a constant temperature of 25° C. and a rotational speed of 5 rpm.

Referring back to the first and second polymers, these polymers are typically reacted in a molar ratio of up to approximately 1:1. In one embodiment, the first and second polymers are reacted in a molar ratio of approximately 1:1. However, the first and second polymers are not limited to these amounts and may be reacted in amounts as chosen by one of skill in the art. It is also contemplated that one of the first and second polymers may be reacted in excess as compared to the other. The chain terminator is typically reacted in an amount of from 0.001 to 10 percent by weight based on the combined weight of the first and second polymers. The amount of the chain terminator that is reacted is not limited to this amount and may be varied by one of skill in the art. Typically, one of skill in the art will choose an amount of the chain terminator based on a desired viscosity of the polymer of the dispersed particles.

The first and second polymers and the chain terminator are reacted in the presence of a metal catalyst. The metal catalyst may include elemental metals, metal compounds, metal alloys, metal salts, and combinations thereof. In one embodiment, the metal catalyst is further defined as an organometallic catalyst. Typically, the metal catalyst includes a Group VIIIB transition metal. In another embodiment, the metal catalyst includes at least one of platinum, palladium, tin, titanium, copper, rhodium, or lead. In a further embodiment, the metal catalyst includes at least one of palladium or platinum. In still a further embodiment, the metal catalyst includes platinum. It is also contemplated that the metal catalyst may consist essentially of, or consist of, the metal (e.g. palladium or platinum).

Typically, the metal catalyst is of the type known for addition reactions of Si—H functional siloxanes to unsaturated siloxanes. The metal catalyst may be a hydrosilylation catalyst and that may be deposited on a carrier such as silica gel or powdered charcoal. Alternatively, the metal catalyst may be a platinum or rhodium salt or compound such as platinic chloride or chloroplatinic acid or a platinum or rhodium complex. Most typically, the metal catalyst is further defined as a methyl siloxane soluble platinum catalyst and may include a complex of platinum and a vinylsiloxane. The metal catalyst may include $Pt^{IV}$, for example platinic chloride or chloroplatinic acid, or a complex prepared from chloroplatinic acid hexahydrate and divinyltetramethyldisiloxane.

The dispersion may also include a surfactant. In various embodiments, the dispersion includes the (first) surfactant and a second surfactant or multiple surfactants. The surfactant may be combined with the liquid, such as a polymeric liquid, with the first polymer, the second polymer, and/or the chain terminator, prior to formation of the dispersion. Typically, the surfactant is combined with the polymeric liquid before the dispersion is formed. Surfactants are also known as emulsifiers, emulgents, and tensides. Relative to this invention, the terminology "surfactant", "emulsifier", "emulgent", and "tenside" may be used interchangeably. Surfactants reduce a surface tension of a liquid by adsorbing at a liquid-gas interface. Surfactants also reduce interfacial tension between polar and non-polar molecules by adsorbing at a liquid-liquid interface. Without intending to be bound by any particular theory, it is believed that surfactants act at these interfaces and are dependent on various forces including, excluded volume repulsion forces, electrostatic interaction forces, van der waals forces, entropic forces, and steric forces. In the instant invention, the surfactant may be chosen or manipulated based on one or more of these forces.

The surfactant, first and second surfactants, or first/second/ and multiple surfactants may independently be selected from the group of non-ionic surfactants, cationic surfactants, anionic surfactants, amphoteric surfactants, and combinations thereof. Suitable non-ionic surfactants include, but are not limited to, alkylphenol alkoxylates, ethoxylated and propoxylated fatty alcohols, alkyl polyglucosides and hydroxyalkyl polyglucosides, sorbitan derivatives, N-alkylglucamides, alkylene oxide block copolymers such as block copolymers of ethylene oxide, propylene oxide and/or butylene oxide, polyhydroxy and polyalkoxy fatty acid derivatives, amine oxides, silicone polyethers, various polymeric surfactants based on polysaccharides, polymeric surfactants based on polyvinyl alcohol and polyacrylamide, and combinations thereof.

Suitable cationic surfactants include, but are not limited to, interface-active compounds including ammonium groups such as alkyldimethylammonium halides and compounds having the chemical formula $RR'R''R'''N^+X^-$ wherein R, R', R'', and R''' are independently selected from the group of alkyl groups, aryl groups, alkylalkoxy groups, arylalkoxy groups, hydroxyalkyl(alkoxy) groups, and hydroxyaryl(alkoxy) groups and wherein X is an anion.

Suitable anionic surfactants include, but are not limited to, fatty alcohol sulfates and sulfates of ethoxylated fatty alcohols. Further non-limiting examples of suitable anionic surfactants include alkanesulfonates, linear alkylbenzenesulfonates, linear alkyltoluenesulfonates, diphenyl sulfonates, and diphenylether sulfonates. Still further, the anionic surfactant may include olefinsulfonates and di-sulfonates, mixtures of alkene- and hydroxyalkane-sulfonates or di-sulfonates, alkyl ester sulfonates, sulfonated polycarboxylic acids, alkyl glyceryl sulfonates, fatty acid glycerol ester sulfonates, alkylphenol polyglycol ether sulfates, paraffinsulfonates, alkyl phosphates, acyl isothionates, acyl taurates, acyl methyl taurates, alkylsuccinic acids, alkenylsuccinic acids and corresponding esters and amides thereof, alkylsulfosuccinic acids and corresponding amides, mono- and di-esters of sulfosuccinic acids, acyl sarcosinates, sulfated alkyl polyglucosides, alkyl polyglycol carboxylates, hydroxyalkyl sarcosinates, and combinations thereof. Still further, polymeric anionic surfactants based on acrylic acid or sulfonated polystyrene, and combinations thereof, may also be used. Suitable ampholytic surfactants include, but are not limited to, aliphatic derivatives of secondary and/or tertiary amines which include an anionic group, betaine derivatives, and combinations thereof.

Additionally, the surfactant and/or first and second surfactants may independently include aliphatic and/or aromatic alkoxylated alcohols, LAS (linear alkyl benzene sulfonates), paraffin sulfonates, FAS (fatty alcohol sulfates), FAES (fatty alcohol ethersulfates), alkylene glycols, trimethylolpropane ethoxylates, glycerol ethoxylates, pentaerythritol ethoxylates, alkoxylates of bisphenol A, and alkoxylates of 4-methylhexanol and 5-methyl-2-propylheptanol, and combinations thereof. Further, the surfactant and/or first and second surfactants may include alkylpolysaccharides including linear or branched alkyl groups, linear or branched alkenyl groups, alkylphenyl groups, alkylene groups, and/or combinations thereof. Typically, the surfactant is present in an amount of from 0.1 to 100, more typically of from 0.01 to 5, even more typically of from 0.5 to 5, and most typically of from 1.5 to 2.5, parts by weight per 100 parts by weight of the dispersion.

The dispersion may also include a thickener. As is known in the art, thickeners increase a viscosity of the dispersion at low shear rates while maintaining flow properties of the dispersion at higher shear rates. Suitable thickeners for use in the instant invention include, but are not limited to, polyalkylene oxides such as polyethylene oxide, polypropylene oxide, polybutylene oxide, and combinations thereof. In one embodiment, the thickener is selected from the group of algenic acid and its derivatives, polyethylene oxide, polyvinyl alcohol, methyl cellulose, hydroxypropylmethyl cellulose, alkyl and hydroxyalkyl cellulose, carboxymethyl cellulose, hydroxyethyl cellulose, guar gum, gum arabic, gum ghatic, polyvinylpyrrolidone, starch, modified starch, tamarind gum, xanthan gum, polyacrylamide, polyacrylic acid, and combinations thereof.

The thickener may be combined with the liquid, with the first polymer, the second polymer, and/or the chain terminator, before or after the dispersion is formed. Typically, the thickener is combined with the liquid after the dispersion is formed. In one embodiment, the thickener is combined with a liquid in which it is not soluble and this mixture is combined with the dispersion after it has been formed. Examples of such liquids include, but are not limited to, propylene glycol, ethylene glycol, glycerin, and combinations thereof. The thickener is typically present in an amount of from 0.001 to 25, more typically of from 0.05 to 5, and most typically of from 0.1 to 0.5, parts by weight per 100 parts by weight of the dispersion.

The dispersion may also include additives. The additives may include, but are not limited to, conductivity-enhancing additives, salts, dyes, perfumes, preservatives, biocides, plasticizers, active ingredients, colorants, labeling agents, rust inhibitors, and combinations thereof. In one embodiment, the conductivity-enhancing additive includes an ionic compound. In another embodiment, the conductivity-enhancing additives are generally selected from the group of amines, organic salts and inorganic salts, and mixtures thereof. Typical conductivity-enhancing additives include amines, quaternary ammonium salts, quaternary phosphonium salts, ternary sulfonium salts, and mixtures of inorganic salts with organic ligands. More typical conductivity-enhancing additives include quaternary ammonium-based organic salts including, but not limited to, tetrabutylammonium chloride, tetrabutylammonium bromide, tetrabutylammonium iodide, phenyltrimethylammonium chloride, phenyltriethylammonium chloride, phenyltrimethylammonium bromide, phenyltrimethylammonium iodide, dodecyltrimethylammonium chloride, dodecyltrimethylammonium bromide, dodecyltrimethylammonium iodide, tetradecyltrimethylammonium chloride, tetradecyltrimethylammonium bromide, tetradecyltrimethylammonium iodide, hexadecyltrimethylammonium chloride, hexadecyltrimethylammonium bromide, and hexadecyltrimethylammonium iodide. The additive may be present in either the continuous or dispersed phase of the dispersion in any amount selected by one of skill in the art so long as the amount of the additive allows the first and second polymers and the chain terminator to react. In various embodiments, the amount of the additive is typically of from about 0.0001 to about 25%, more typically from about 0.001 to about 10%, and more typically from about 0.01 to about 1% based on the total weight of the first and second polymers.

In one embodiment, the dispersion includes a lipophilic additive that may be mixed with a hydrocarbon solvent, for example toluene. In another embodiment, the lipophilic additive is an MQ resin including triorganosilyl units and $SiO_{4/2}$ units and may include a hydrophobic filler such as a treated silica. Further, a lipophilic additive such as a perfume, sunscreen or pharmaceutical additive may also be added to the dispersion.

The dispersion may be further defined as an emulsion and the first and second polymers and the chain terminator may be reacted to form a silicone organic copolymer in water. In one embodiment, the silicone organic copolymer includes polydiorganosiloxane blocks and organic blocks and has a dynamic viscosity at 0.01 Hz in the range 10 to 1,000,000 Pa·s at 25° C. and a mean particle size of 0.3 to 1,000 micrometers. In one embodiment, the dispersion has a silicone loading of from 1 to 94 weight percent. It is contemplated that the liquid, the first and second polymers, the metal catalyst, and any additives, surfactants, or thickeners may be the same as those set forth in U.S. Pat. Nos. 6,878,773 and 6,013,682, which are expressly incorporated herein by reference.

The dispersions of the instant invention are useful in most known applications for silicone emulsions, for example in personal care applications such as on hair, skin, mucous membrane or teeth. In many of these applications, the dispersion is lubricious and improves the properties of skin creams, skin care lotions, moisturizers, facial treatments such as acne or wrinkle removers, personal and facial cleansers, bath oils, perfumes, fragrances, colognes, sachets, sunscreens, pre-shave and after shave lotions, shaving soaps and shaving lathers. The dispersion can likewise be use in hair shampoos, hair conditioners, hair sprays, mousses, permanents, depilatories, and cuticle coats, for example to provide styling and conditioning benefits. In cosmetics, the dispersion may function as a leveling and spreading agent for pigment in make-ups, color cosmetics, foundations, blushes, lipsticks, eye liners, mascaras, oil removers, color cosmetic removers and powders. The dispersion may also be useful as a delivery system for oil and water soluble substances such as vitamins, organic sunscreens, ceramides, pharmaceuticals and the like. When compounded into sticks, gels, lotions aerosols and roll-ons, the dispersion may impart a dry silky-smooth payout. The dispersion may also be mixed with deposition polymers, surfactants, detergents, antibacterials, anti-dandruffs, foam boosters, proteins, moisturizing agents, suspending agents, opacifiers, perfumes, coloring agents, plant extracts, polymers, and other conventional care ingredients. In one embodiment, the dispersion is included in a water based composition that is selected from the group of cosmetic compositions, coating compositions, and combinations thereof. The dispersion may be used in personal care products in amounts of from 0.01 to about 50, and more typically in amounts of from 0.1 to 25, weight percent of a personal care product.

The dispersion may also be useful for numerous other applications such as textile fiber treatment, leather lubrication, fabric softening, release agents, water based coatings, oil drag reduction, particularly in crude oil pipelines, lubrication, facilitation of cutting cellulose materials, and in many other areas where silicones are conventionally used. The dispersion may also be used to reduce oil drag.

The present invention also provides the method of forming the dispersion. The method includes the step of combining the first and second polymers, and the chain terminator. In one embodiment, the step of combining is further defined as combining the liquid with the first and second polymers and the chain terminator. This step may include emulsifying the first and second polymers and the chain terminator with the liquid. The step of combining forms the dispersion but may not form the particles. The liquid, the first and second polymers, and the chain terminator may be combined in any order. In one embodiment, the first and second polymers are combined to form a mixture. Then, the liquid (e.g. water) is added to the mixture of the first and second polymers. Optionally, in this embodiment, the surfactant may be added to the liquid prior to, concurrent with, or after addition to the first and second polymers. In one embodiment, the metal catalyst is added to the dispersion. The metal catalyst may be added to any one or combinations of the first and second polymers, the chain terminator, and/or the liquid. Typically, the metal catalyst is added to one or more of the first and second polymers and/or the chain terminator. The metal catalyst can be added before or after formation of the dispersion or both before and after formation. In some cases, the metal catalyst causes reaction of the first and second polymers and the chain terminator to occur immediately. In this case, a catalyst inhibitor may be used or the catalyst may be added to the mixture of the first and second polymers after emulsification with water and a surfactant. Suitable platinum catalyst inhibitors are well known in the art and include, but are not limited to, acetylenic diols, cyclohexenyl alcohol derivatives, maleic acid esters, and combinations thereof.

In one embodiment, the dispersion of the instant invention is formed by simple agitation to form a coarse water in oil mixture. This mixture is then emulsified. During emulsification, the coarse water in oil mixture is inverted into a fine silicone in water emulsion. The emulsification can be accomplished by conventional methods such as with ribbon mixers, plow mixers, fluidizing paddle mixers, sigma blade mixers, tumble blenders, vortex mixers, feed mixers, vertical mixers, horizontal mixers, and combinations thereof.

In another embodiment, the first and second polymers are emulsified in water with a surfactant and the metal catalyst is added to the emulsion. A nonionic surfactant is typically used in this embodiment. However, it is to be understood that other types of surfactants can also be used. Typically, a final use of the dispersion will determine which type and which particular surfactants are used, if any. However, some surfactants, such as cationic surfactants, may include compounds that could inhibit catalysis of a hydrosilylation reaction by metal catalysts including $Pt^{IV}$ compounds.

In a further embodiment, the first and second polymers are emulsified in water with an anionic, cationic or amphoteric surfactant and the metal catalyst is dispersed in a nonionic surfactant before being added to the emulsion. The metal catalyst can simply be mixed with the nonionic surfactant and added to the dispersion or the metal catalyst and nonionic surfactant can be premixed with water before being added. The amount of nonionic surfactant used is typically 0.1-10 parts per volume per part of a commercial platinum catalyst preparation (about 2-200 parts by weight per part of platinum in the metal catalyst). In one embodiment, the metal catalyst is present in an emulsion different from the dispersion and is combined with the dispersion.

The method also includes the step of reacting the first and second polymers and the chain terminator in the presence of the metal catalyst to form the dispersed particles. As set forth above, the first and second polymer typically react in a chain elongation reaction (e.g., a step growth polymerization reaction) in the presence of the metal catalyst. The step of reacting may also be referred to as a mechanical suspension polymerization type of reaction step. More specifically, it is believed that the Si—H moieties of the first polymer react with the silicon bonded unsaturated moieties of the second polymer to form a chain. As introduced above, the metal catalyst may be present in an emulsion different from the dispersion and the step of reacting may be further defined as combining the emulsion with the dispersion. It is contemplated that the method may consist essentially of, or consist of, the steps of combining and reacting.

The method may also include the steps of determining a desired viscosity of the particles and determining an approximate amount of the chain terminator to include in the dispersion. In this embodiment, the step of combining is further defined as combining the determined amount of the chain terminator with the first and second polymers. The step of determining the desired viscosity of the particles may be completed using any methods known in the art. Similarly, the step of determining the approximate amount of the chain terminator to include in the dispersion may be completed using any methods known in the art. Typically, a series of dispersions is created using varying amounts of a chain terminator starting with zero. These dispersions can then be processed by any methods in the art and a viscosity of the particles can be measured, as described in greater detail below in the Examples. The viscosity measurements can be plotted on a graph against the varying amounts of the chain terminator used. This allows for controlled formation of the dispersions and particles for maximized manipulation and customization to meet needs of end users.

EXAMPLES

A series of dispersions and dispersed particles are produced according to the instant invention. The dispersed particles are then separated from the dispersions and measured to determine dynamic viscosity. As described in greater detail below, and as set forth in Tables 1 and 2, the instant method of preparing the dispersions allows for control of dynamic viscosity of the particles.

Example 1A

Formation of a First Dispersion

To form the First Dispersion, 58.82 g of a dimethylvinyl terminated polydimethylsiloxane polymer having a kinematic viscosity of 55,000 $mm^2$/sec., an approximate number average molecular weight of about 61,500 and a vinyl content of 0.088, as the First Polymer, is loaded into a Max100 cup followed by 1.18 g of dimethylhydrogen terminated polydimethylsiloxane having a kinematic viscosity of approximately 10 $mm^2$/sec and a hydrogen content of 0.16%, as the Second Polymer, and 0.028 g of $(CH_3)_3SiOSiH(CH_3)OSi(CH_3)_3$ as the Chain Terminator. The cup is then spun for 20 seconds at maximum speed using a SpeedMixer® DAC 150 commercially available from FlackTek, Inc., of Landrum S.C. 1.6 g of polyoxyethylene 4 lauryl ether (Brij® 30) as a First Surfactant is then added to the cup followed by 2.0 g of a 72% solution of polyoxyethylene 23 lauryl ether (Brij® 35L) as a Second Surfactant and 1.2 g of water. The cup is spun for 2×20 seconds and the inside walls of the cup are scraped between each spin. After mixing, a thick paste-like dispersion is formed and diluted through addition of water in increments starting at 2 grams. The increments are increased about 2-fold after each addition of water. The cup is then spun for 20 seconds after each addition of water. In total, an additional 34.2 g of water is added to the dispersion. After addition of the water, the dispersion has the appearance of a milky-white emulsion.

0.35 g of an aqueous emulsion of a platinum catalyst is then added to the cup and is spun for 20 seconds. Following spinning, the cup and its contents are allowed to remain undisturbed for about 18 hours. The emulsion of the platinum catalyst is prepared by emulsifying a Pt divinyltetramethyl disiloxane complex in vinyl siloxanes (such as Dow Corning® Syloff 4000 Catalyst) and in water using a high shear processor such as a sonic probe or homogenizer in the presence of an ethoxylated alcohol surfactant having an HLB of approximately 14.5 such that the platinum catalyst emulsion includes approximately 40 ppm Pt as elemental Pt (approximately 8% commercial Pt catalyst mixture) and approximately 30% ethoxylated alcohol surfactant, with the balance being water. After the platinum catalyst emulsion remains for 18 hours at ambient laboratory conditions, 0.09 g of a preservative (Kathon® CG) is added to the cup and the cup is again spun for 20 seconds to mix ingredients and form a dispersion. The resulting dispersion includes approximately 60% by weight of dispersed polymeric particles in an aqueous o/w dispersion (i.e., an emulsion). The dispersion has an approximate mean particle size of 0.5 μm.

Example 1B

Evaluation of the First Dispersion

After formation of the First Dispersion, 10 g of First Dispersion is loaded into a 30 ml glass vial followed by 15 g of isopropyl alcohol. The vial is vigorously shaken by hand, resulting in the First Dispersion breaking apart (de-emulsification). Subsequently, the vial is centrifuged for five minutes using a laboratory centrifuge to produce a multi-layered mixture including a lower, opaque, thick polymer layer and a less viscous, cloudy alcohol layer. The alcohol is decanted and discarded. 15 g of isopropyl alcohol and 2 g of water are then added to the vial and the contents are mixed by hand using a spatula and by vigorously shaking the vial. The vial is then centrifuged again for five minutes. The clear alcohol layer is again decanted and discarded. The dispersed polymeric particles coagulate into a polymeric mass and this mass is then removed from the vial and put into a Petri dish and allowed by dry at ambient laboratory conditions for seven days. Dynamic viscosity of the polymeric particles is measured using a Rheodyne Rheomics rheometer with an oscillation procedure (frequency sweep) of from $10^2$ to $10^{-2}$ Hz. The dynamic viscosity of the polymeric particles is set forth in Table 1 below.

Examples 2A/B-5A/B

Formation of Additional Dispersions

Three additional dispersions (a Second, Third, and Fourth Dispersion) are also formed according to the instant invention. These additional dispersions are formed from the same method described immediately above except that a different amount of the Chain Terminator is used. More specifically, the Second Dispersion is formed using 0.087 g of $(CH_3)_3SiOSiH(CH_3)OSi(CH_3)_3$ as the Chain Terminator. The Third Dispersion is formed using 0.122 g of $(CH_3)_3SiOSiH(CH_3)OSi(CH_3)_3$ as the Chain Terminator. The Fourth Dispersion is formed using 0.230 g of $(CH_3)_3SiOSiH(CH_3)OSi(CH_3)_3$ as the Chain Terminator. After formation, the polymeric particles of each of the Second through Fourth Dispersions are evaluated for Dynamic Viscosity in the same way as described above. The dynamic viscosities of the polymeric particles are also set forth in Table 1 below.

Comparative Example 1A

Formation of a First Comparative Dispersion

A First Comparative Dispersion is formed in the same way as the First through Fourth Dispersions described above, except that no Chain Terminator is used.

Comparative Example 1B

Evaluation of the First Comparative Dispersion

The polymeric particles of the First Comparative Dispersion are evaluated for dynamic viscosity using the same method described above. The dynamic viscosity of these polymeric particles is also set forth in Table 1 below.

TABLE 1

| | First Comp. Dispersion | First Dispersion | Second Dispersion | Third Dispersion | Fourth Dispersion |
|---|---|---|---|---|---|
| Amount of Chain Terminator (g/60 g particles) | 0 | 0.028 | 0.087 | 0.122 | 0.230 |
| Dynamic Viscosity of the Particles $\eta$, cP × $10^6$ ($10^{-2}$ Hz.); 24° C. | 124 | 42 | 11 | 6.5 | 1.9 |

Example 6A

Formation of a Sixth Dispersion

To form a Sixth Dispersion, 50.15 g of a dimethylvinyl terminated polydimethylsiloxane polymer having a kinematic viscosity of 55,000 mm$^2$/sec., an approximate number average molecular weight of about 61,500 and a vinyl content of 0.088, as the First Polymer, is loaded into a Max 100 cup followed by 1.04 g of dimethylhydrogen terminated polydimethylsiloxane having a kinematic viscosity of approximately 10 mm$^2$/sec and a hydrogen content of 0.16%, as the Second Polymer, and 0.034 g of $(CH_3)_2Si(C_6H_5)H$ as the Chain Terminator. The cup is closed and spun for 20 seconds at maximum speed using a SpeedMixer® DAC 150. Subsequently, 1.75 g of polyoxyethylene 3 lauryl ether (Volpo® L3) as the First Surfactant and 2.39 g of polyoxyethylene 23 lauryl ether (Volpo® L23) as the Second Surfactant are loaded into the cup followed by 1.46 g of water. The cup is then closed and spun 2×20 seconds at maximum speed to form a dispersion. The dispersion, which is inverted after the first spin, attains a thick, paste-like consistency. Between spins, interior walls of the cup are scraped with a spatula. The dispersion is then diluted incrementally with water and the cup is spun between each dilution. A total of 27.44 g of $H_2O$ is added for dilution. Following dilution, 0.162 g of the same Pt catalyst aqueous emulsion described above is added and the cup is spun again for 20 seconds to mix the ingredients and form a dispersion. The resulting dispersion includes approximately 60% by weight of dispersed polymeric particles having a mean particle size less than 1 µm and dispersed in an aqueous o/w dispersion (i.e., an emulsion) having an approximate mean particle size of 0.5 um.

Example 6B

Evaluation of the Sixth Dispersion

After one day, the polymeric particles are separated from the dispersion using the same method described above relative to Example 1A. The dynamic viscosity of the polymeric particles is then determined using a Carrimed Rheometer.

Examples 7A/B-10A/B

Formation and Evaluation of Additional Dispersions

Four additional dispersions (a Seventh, Eighth, Ninth, and Tenth Dispersion) are also formed according to the instant invention. The Seventh through Ninth Dispersions are formed from the same method described immediately relative to Example 6 above except that different amounts of the Chain Terminator are used. More specifically, the Seventh Dispersion is formed using 0.068 g of $(CH_3)_2Si(C_6H_5)H$ as the Chain Terminator. The Eighth Dispersion is formed using 0.134 g of $(CH_3)_2Si(C_6H_5)H$ as the Chain Terminator. The Ninth Dispersion is formed using 0.248 g of $(CH_3)_2Si(C_6H_5)H$ as the Chain Terminator. After formation, the polymeric particles of each of the Seventh through Ninth Dispersions are evaluated for Dynamic Viscosity in the same way as described above. The dynamic viscosities of the polymeric particles are set forth in Table 2 below.

To form the Tenth Dispersion, 55.0 g of a dimethylvinyl terminated polydimethylsiloxane polymer having a kinematic viscosity of 55,000 $mm^2$/sec., an approximate number average molecular weight of about 61,500 and a vinyl content of 0.088, as the First Polymer, is loaded into a Max100 cup followed by 1.10 g of dimethylhydrogen terminated polydimethylsiloxane having a kinematic viscosity of approximately 10 $mm^2$/sec and a hydrogen content of 0.16%, as the Second Polymer, and 0.051 g of 1-hexene as the Chain Terminator. The cup is spun for 25 seconds at maximum speed using a SpeedMixer® DAC 150, available from FlackTek, Inc., Landrum, S.C. 29365. Subsequently, 2.65 g of a 72% solution of polyoxyethylene (23) lauryl ether (Brij® 35L) as the Surfactant and 2.8 g of water are loaded into the cup. The cup is then spun for 2×25 seconds at maximum speed and the inside walls of the cup are scraped between each spin. After mixing, a thick paste-like dispersion is formed and diluted through addition of water in increments starting at 2 grams. The increments are increased about 2-fold after each addition of water. The cup is then spun for 25 seconds after each addition of water. In total, an additional 31.0 g of water is added to the dispersion. After addition of the water, the dispersion has the appearance of a milky-white emulsion.

Then, 0.68 g of an aqueous emulsion of the platinum catalyst as described in Example 1A is added to the cup and is spun for 20 seconds. Following spinning, the cup and the emulsion are heated in an oven for 4 hours at 50° C. The emulsion is allowed to cool to room temperature for one hour after which 10 g of the emulsion is removed using a pipette and placed into a Max 40 cup. 20 g of absolute ethanol is then added to the Max 40 cup and its contents are spun in the SpeedMixer® DAC 150 at maximum speed for 25 seconds. During spinning, the emulsion breaks apart and forms two phases: an upper alcohol/water phase and a lower polymer phase. The alcohol/water layer is decanted from the cup and the polymeric phase is removed from the cup with a spatula and placed in a 100 mm diameter plastic Petri dish. The Petri dish is placed in a 60° C. air-circulating oven for 18 hours. The polymeric phase is then allowed to cool to room temperature for 30 minutes and its viscosity is determined using a rheometer. The Dynamic viscosity of this polymeric phase is approximately 5.33 million centipoise (cP) at $10^{-2}$ $sec^{-1}$ at 24° C.

Comparative Example 2A

Formation of a Second Comparative Dispersion

A Second Comparative Dispersion is formed in the same way as the Seventh through Ninth Dispersions described above, except that no Chain Terminator is used.

Comparative Example 2B

Evaluation of the Second Comparative Dispersion

The polymeric particles of the Second Comparative Dispersion are evaluated for dynamic viscosity using the same method described above. The dynamic viscosity of these polymeric particles is also set forth in Table 2 below.

Comparative Example 3A

Formation of a Third Comparative Dispersion

A Third Comparative Dispersion is formed in the same way as the Tenth Dispersion described above, except that no Chain Terminator is used.

Comparative Example 3B

Evaluation of the Third Comparative Dispersion

The polymeric particles of the Third Comparative Dispersion are evaluated for dynamic viscosity using the same method described above. The dynamic viscosity of these polymeric particles is also set forth in Table 2 below.

TABLE 2

| | Second Comp. Dispersion | Third Comp. Dispersion | Sixth Dispersion | Seventh Dispersion |
|---|---|---|---|---|
| Amount of Chain Terminator (g/60 g particles) | 0 | 0 | 0.034 | 0.068 |
| Dynamic Viscosity of the Particles $\eta$, cP × $10^6$ ($10^{-2}$ Hz.); 24° C. | 626.95 | 162.52 | 11.70 | 7.26 |

| | Eighth Dispersion | Ninth Dispersion | Tenth Dispersion |
|---|---|---|---|
| Amount of Chain Terminator (g/60 g particles) | 0.134 | 2.15 | 0.056 |
| Dynamic Viscosity of the Particles $\eta$, cP × $10^6$ ($10^{-2}$ Hz.); 24° C. | 2.15 | 0.92 | 5.33 |

As shown in Tables 1 and 2 above, the dynamic viscosity of the particles of the First through Tenth Dispersions is generally much lower than the dynamic viscosity of the particles of the First, Second, and Third Comparative Dispersions. That is, without use of the Chain Terminator, the dynamic viscosity of the particles of the First, Second, and Third Comparative Dispersions is very high. The data show that upon adding the Chain Terminator, the dynamic viscosity of the particles declines and is controllable. Parabolic graphs of dynamic viscosity versus amount of Chain Terminator can be generated for the First through Fifth Dispersions, the Sixth through Ninth Dispersions, and the Tenth Dispersion. Additionally, equations can be generated to fit the graphs and can be used to predict dynamic viscosity. These equations allow for manipulation and customization of dispersions and particles tailored to needs of end users.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A method of forming a dispersion comprising dispersed particles, said method comprising the steps of:

A. combining a first polymer having at least two Si—H moieties, a second polymer having at least two silicon bonded unsaturated moieties, and a chain terminator having one Si—H moiety or one carbon-carbon double bond; and
B. reacting the first polymer, the second polymer, and the chain terminator in the presence of a metal catalyst to form the dispersed particles,
wherein the chain terminator has the chemical formula: $(CH_3)_3SiOSi(CH_3)$ $HOSi(CH_3)_3$ or $(CH_3)_2Si(C_6H_5)H$ or the chain terminator has one carbon-carbon double bond and is further defined as an alpha olefin; and
wherein the dispersed particles have a size of less than about 1 μm.

2. A method as set forth in claim 1 wherein the at least two Si—H moieties and the at least two silicon bonded unsaturated moieties are terminal moieties.

3. A method as set forth in claim 1 wherein the first polymer has two terminal Si—H moieties and the second polymer has two terminal silicon bonded unsaturated moieties.

4. A method as set forth in claim 1 wherein the step of combining further comprises combining a liquid with the first polymer, the second polymer, and the chain terminator.

5. A method as set forth in claim 4 wherein the liquid is further defined as water.

6. A method as set forth in claim 1 wherein the first and second polymers comprise less than about 2 mole percent of branching units.

7. A method as set forth in claim 1 wherein the first and second polymers are further defined as polydimethylsiloxanes.

8. A method as set forth in claim 1 wherein the metal catalyst is further defined as an organometallic catalyst.

9. A method as set forth in claim 1 wherein the dispersion has a viscosity of about 50,000 cps at 25° C.

10. A method as set forth in claim 1 wherein the first and second polymers are reacted in a molar ratio of approximately 1:1.

11. A method as set forth in claim 1 wherein the metal catalyst is present in an emulsion different from the dispersion and the step of reacting is further defined as combining the emulsion with the dispersion.

12. A method as set forth in claim 1 further comprising the steps of determining a desired viscosity of the dispersed particles and determining an approximate amount of the chain terminator to include in the dispersion and wherein the step of combining is further defined as combining the determined amount of the chain terminator with the first and second polymers.

13. A dispersion comprising a liquid and particles dispersed in the liquid and comprising a reaction product of:
A. a first polymer having at least two Si—H moieties,
B. a second polymer having at least two silicon bonded unsaturated moieties, and
C. a chain terminator having one Si—H moiety or one carbon-carbon double bond;
wherein the first polymer, the second polymer, and the chain terminator are reacted in the presence of a metal catalyst, and
wherein the chain terminator has the chemical formula: $(CH_3)_3SiOSi(CH_3)$ $HOSi(CH_3)_3$ or $(CH_3)_2Si(C_6H_5)H$ or the chain terminator has one carbon-carbon double bond and is further defined as an alpha olefin; and
wherein the particles have a size of less than about 1 μm.

14. A dispersion as set forth in claim 13 wherein said at least two Si—H moieties and said at least two silicon bonded unsaturated moieties are terminal moieties.

15. A dispersion as set forth in claim 13 wherein said first polymer has two terminal Si—H moieties and said second polymer has two terminal silicon bonded unsaturated moieties.

16. A dispersion as set forth in claim 13 wherein said first and second polymers comprise less than about 2 mole percent of branching units.

17. A dispersion as set forth in claim 13 wherein said two silicon bonded unsaturated moieties are further defined as vinyl moieties.

18. A dispersion as set forth in claim 13 wherein said first and second polymers are further defined as polydimethylsiloxanes.

19. A dispersion as set forth in claim 13 wherein said dispersion has a viscosity of about 50,000 cps at 25° C.

20. A dispersion as set forth in claim 13 wherein said first and second polymers are reacted in a molar ratio of approximately 1:1.

21. A water based composition comprising the dispersion set forth in claim 13 and selected from cosmetic compositions, coating compositions, and combinations thereof.

22. A dispersion as set forth in claim 13 wherein the liquid is water.

23. A dispersion comprising a liquid and particles dispersed in the liquid and comprising a reaction product of:
A. a first polymer having at least two Si—H moieties,
B. a second polymer having at least two silicon bonded unsaturated moieties, and
C. a chain terminator having one carbon-carbon double bond and further defined as an alpha olefin:
wherein the first polymer, the second polymer, and the chain terminator are reacted in the presence of a metal catalyst; and
wherein the particles have a size of less than about 1 μm.

24. A dispersion as set forth in claim 23 wherein the liquid is water.

25. A dispersion as set forth in claim 23 wherein the first polymer has two terminal Si—H moieties and the second polymer has two terminal silicon bonded unsaturated moieties.

26. A dispersion as set forth in claim 23 wherein the first and second polymers comprise less than about 2 mole percent of branching units.

27. A dispersions set forth in claim 23 wherein the first and second polymers are further defined as pilydimethylsiloxanes.

28. A dispersion as set forth in claim 23 wherein the dispersed particles have a size of less than about 1 μm.

29. A dispersion as set forth in claim 23 having a viscosity of about 50,000 cps at 25° C.

30. A method of forming a dispersion comprising dispersed particles, said method comprising the steps of:
A. combining a first polymer having at least two Si-H moieties, a second polymer having at least two silicon bonded unsaturated moieties, and a chain terminator having one Si-H moiety or one carbon-carbon double bond; and
B. reacting the first polymer, the second polymer, and the chain terminator in the presence of a metal catalyst to form the dispersed particles, wherein the chain terminator has the chemical formula: $(CH_3)_3SiOSi(CH_3)HOSi(CH_3)_3$ or $(CH_3)_2Si(C_6H_5)H$.

31. A method as set forth in claim 30 wherein the dispersed particles have a size of less than about 1 μm.

32. A method as set forth in claim 31 wherein the dispersion has a viscosity of about 50,000 cps at 25° C.

33. A dispersion comprising a liquid and particles dispersed in the liquid and comprising a reaction product of;
  A. a first polymer having at least two Si-H moieties,
  B. a second polymer having at least two silicon bonded unsaturated moieties, and
  C. a chain terminator having one Si-H moiety or one carbon-carbon double bond;
  wherein the first polymer, the second polymer, and the chain terminator are reacted in the presence of a metal catalyst, and
  wherein the chain terminator has the chemical formula: $(CH_3)_3SiOSi(CH_3)HOSi(CH_3)_3$ or $(CH_3)_2Si(C_6H_5)H$.

34. A method as set forth in claim 33 wherein the dispersed particles have a size of less than about 1 μm.

35. A method as set forth in claim 34 wherein the dispersion has a viscosity of about 50,000 cps at 25° C.

36. A dispersion comprising a liquid and particles dispersed in the liquid and comprising a reaction product of;
  A. a first polymer having at least two Si-H moieties,
  B. a second polymer having at least two silicon bonded unsaturated moieties, and
  C. a chain terminator having one carbon-carbon double bond and further defined as an alpha olefin;
  wherein the first polymer, the second polymer, and the chain terminator are reacted in the presence of a metal catalyst; and
  wherein the dispersion has a viscosity of about 50,000 cps at 25° C.

* * * * *